(12) United States Patent
Chiba

(10) Patent No.: US 9,533,699 B2
(45) Date of Patent: Jan. 3, 2017

(54) STEERING DEVICE

(71) Applicant: KAYABA INDUSTRY CO., LTD., Minato-ku, Tokyo (JP)

(72) Inventor: Shuhei Chiba, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/425,633

(22) PCT Filed: Aug. 23, 2013

(86) PCT No.: PCT/JP2013/072540
§ 371 (c)(1),
(2) Date: Mar. 4, 2015

(87) PCT Pub. No.: WO2014/038398
PCT Pub. Date: Mar. 13, 2014

(65) Prior Publication Data
US 2015/0251684 A1 Sep. 10, 2015

(30) Foreign Application Priority Data

Sep. 5, 2012 (JP) .................................. 2012-195174

(51) Int. Cl.
*B62D 1/19* (2006.01)
*B62D 1/185* (2006.01)
*B60R 21/05* (2006.01)

(52) U.S. Cl.
CPC ............... *B62D 1/192* (2013.01); *B60R 21/05* (2013.01); *B62D 1/185* (2013.01); *B62D 1/195* (2013.01)

(58) Field of Classification Search
CPC ........... B60R 21/05; B62D 1/18; B62D 1/185; B62D 1/19; B62D 1/192
See application file for complete search history.

(56) References Cited

U.S. PATENT DOCUMENTS 4,040,646 A * 8/1977 Becker ................... B62D 1/192
280/750
4,142,423 A * 3/1979 Ikawa ..................... B60R 22/28
188/374

(Continued)

FOREIGN PATENT DOCUMENTS

EP 1916175 A2 4/2008
JP 2003-148539 A 5/2003

(Continued)

OTHER PUBLICATIONS

International Search Report and Written Opinion mailed Nov. 12, 2013, corresponding to International application No. PCT/JP2013/072540.

*Primary Examiner* — Barry Gooden, Jr.
(74) *Attorney, Agent, or Firm* — Hauptman Ham, LLP

(57) ABSTRACT

An impact absorbing device includes an impact absorbing plate provided integrally with the second column tube, the impact absorbing plate being configured to absorb the impact energy, and a pressing member provided integrally with the first column tube, the pressing member being configured to generate deformation resistance by pressing and deforming the impact absorbing plate. A guide hole extending in the axial direction of the steering shaft is formed on the impact absorbing plate, and a guide that relatively moves along the guide hole upon relative movement in the axial direction of the first column tube and the second column tube is provided integrally with the first column tube.

12 Claims, 5 Drawing Sheets

(56) References Cited

U.S. PATENT DOCUMENTS

| | | | | |
|---|---|---|---|---|
| 4,630,716 A * | 12/1986 | Faust | ............... | F16F 7/123 188/371 |
| 4,786,076 A * | 11/1988 | Wierschem | ............ | B62D 1/195 188/376 |
| 4,943,028 A * | 7/1990 | Hoffmann | ............ | B62D 1/195 188/376 |
| 4,989,898 A * | 2/1991 | Yamaguchi | ............ | B62D 1/195 280/777 |
| 5,056,818 A * | 10/1991 | Sadakata | ............. | B62D 1/195 280/777 |
| 5,125,685 A * | 6/1992 | Takahashi | ............ | B60R 16/027 280/775 |
| 5,209,135 A * | 5/1993 | Ichikawa | ............... | B62D 1/181 188/371 |
| 5,511,823 A * | 4/1996 | Yamaguchi | ............ | B62D 1/195 188/371 |
| 5,520,416 A * | 5/1996 | Singer, III | ............ | B62D 1/181 280/775 |
| 6,322,103 B1 * | 11/2001 | Li | ............. | B62D 1/195 280/777 |
| 7,063,354 B2 * | 6/2006 | Riefe | ............... | B60R 21/09 280/777 |
| 7,455,320 B2 * | 11/2008 | Imamura | ............... | B62D 1/195 280/777 |
| 7,455,321 B2 * | 11/2008 | Menjak | ............... | B62D 1/195 280/777 |
| 2002/0024209 A1 * | 2/2002 | Seamon | ............... | B62D 1/192 280/777 |
| 2003/0042723 A1 | 3/2003 | Riefe | | |
| 2004/0164538 A1 * | 8/2004 | Li | ............. | B62D 1/195 280/777 |
| 2005/0194777 A1 * | 9/2005 | Manwaring | ............ | B62D 1/192 280/777 |
| 2005/0263996 A1 * | 12/2005 | Manwaring | ............ | B62D 1/195 280/775 |
| 2006/0290129 A1 * | 12/2006 | Inayoshi | ............ | B62D 1/192 280/777 |
| 2007/0151392 A1 * | 7/2007 | Oshita | ................ | B62D 1/195 74/493 |
| 2007/0228716 A1 * | 10/2007 | Menjak | ................ | B62D 1/192 280/777 |
| 2010/0031768 A1 * | 2/2010 | Oshita | ................ | B62D 1/195 74/492 |
| 2012/0080873 A1 | 4/2012 | Narita et al. | | |
| 2012/0080874 A1 | 4/2012 | Narita et al. | | |
| 2013/0174685 A1 * | 7/2013 | Yamamoto | ............ | B62D 1/184 74/493 |
| 2013/0327176 A1 * | 12/2013 | Domig | ................ | B62D 1/195 74/492 |
| 2015/0128752 A1 * | 5/2015 | Buzzard | ................ | B62D 1/195 74/493 |
| 2015/0225010 A1 * | 8/2015 | Chiba | ................ | B62D 1/185 74/493 |
| 2015/0232117 A1 * | 8/2015 | Stinebring | ............ | B62D 1/185 74/493 |

FOREIGN PATENT DOCUMENTS

| | | |
|---|---|---|
| JP | 2005-41415 A | 2/2005 |
| JP | 2006-199180 A | 8/2006 |
| WO | 2012/017853 A1 | 2/2012 |
| WO | 2012/017854 A1 | 2/2012 |

* cited by examiner

STEERING DEVICE

TECHNICAL FIELD

The present invention relates to a steering device.

BACKGROUND ART

As a conventional steering device, JP2005-41415A discloses a steering device including an impact absorbing device that absorbs impact energy applied to a steering column. The impact absorbing device includes a device that generates a drag force due to a deformation resistance of an impact absorbing plate.

SUMMARY OF INVENTION

The impact absorbing plate described in JP2005-41415A only has a function of absorbing the impact energy that is applied to the steering column.

An object of the present invention is to effectively utilize an impact absorbing plate.

According to one aspect of this invention, a steering device that includes an impact absorbing device for absorbing impact energy applied to a steering shaft via a steering wheel includes a steering column that rotatably supports the steering shaft inserted into an interior thereof, wherein the steering column has a first column tube and a second column tube that are relatively movable in the axial direction. The impact absorbing device includes an impact absorbing plate provided integrally with the second column tube, the impact absorbing plate being configured to absorb the impact energy, and a pressing member provided integrally with the first column tube, the pressing member being configured to generate deformation resistance by pressing and deforming the impact absorbing plate. A guide hole extending in the axial direction of the steering shaft is formed on the impact absorbing plate, and a guide that relatively moves along the guide hole upon relative movement in the axial direction of the first column tube and the second column tube is provided integrally with the first column tube.

DESCRIPTION OF EMBODIMENT

Figure 1:
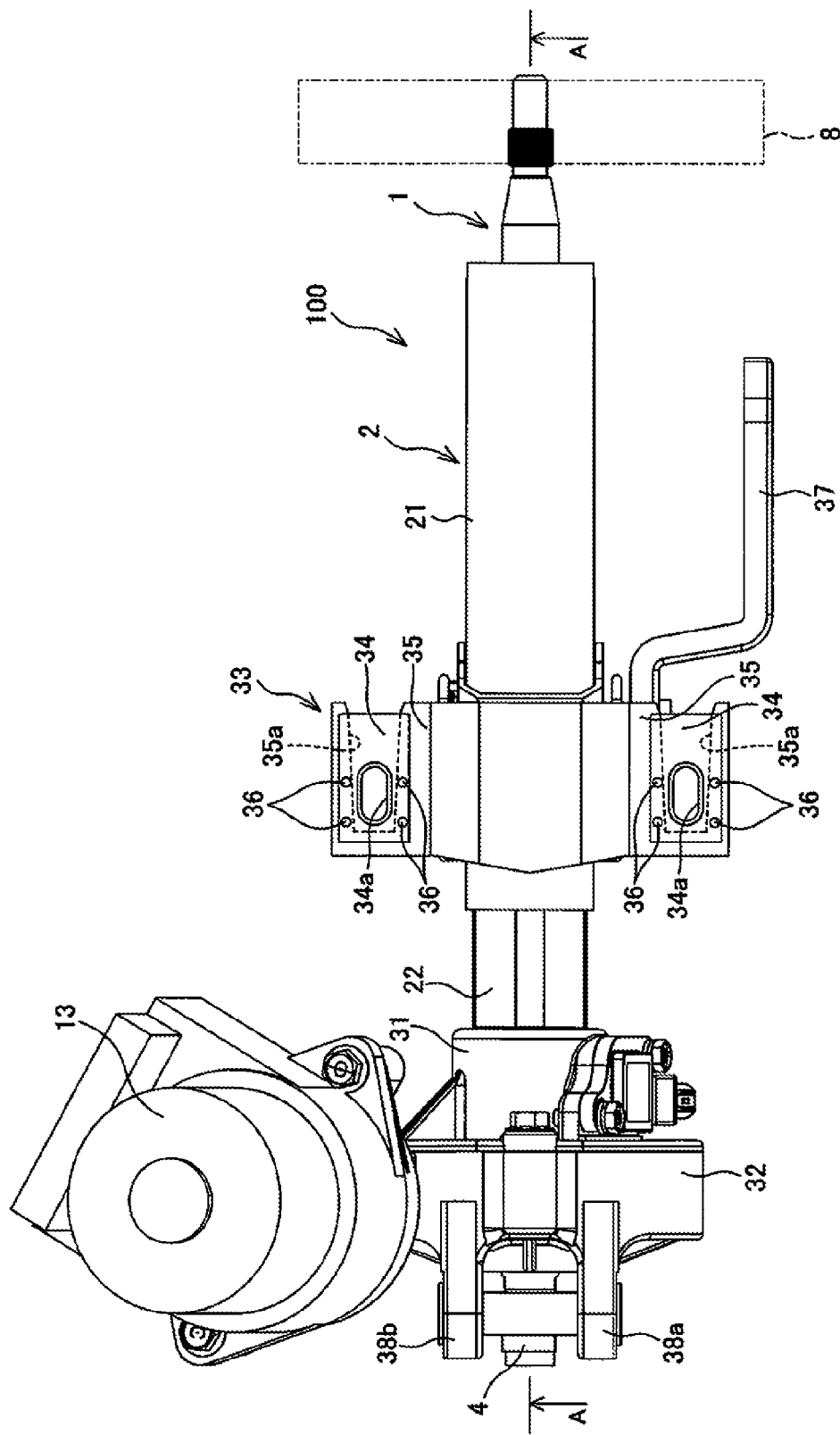
FIG. 1 is a plan view of an electric power steering device according to an embodiment of the present invention.

An embodiment of the present invention will be described with reference to the drawings.

An electric power steering device 100 will be described below as an example of the embodiment of the present invention.

An overall configuration of the electric power steering device 100 will be described with reference to FIGS. 1 to 3.

The electric power steering device 100 is a device that assists a steering force applied to a steering wheel 8 by a driver with a rotation torque from an electric motor 13.

The electric power steering device 100 includes a steering shaft 1 to which the steering wheel 8 is coupled, a steering column 2 that rotatably supports the steering shaft 1 inserted into the interior thereof, and an output shaft 4 that is coupled to the steering shaft 1 via a torsion bar (not shown).

The output shaft 4 is coupled to wheels via universal joints, a pinion, a rack, and so forth. As a driver steers the steering wheel 8, the rack moves in the axial direction to change the directions of the wheels. In the following description, the steering wheel 8 side and the wheels side are described as the upper side and the lower side, respectively.

The rotation torque from the electric motor 13 is transmitted to the output shaft 4 as an assist torque via a speed reducer accommodated in a gear case 32. The electric motor 13 is controlled on the basis of the results detected by a torque sensor that detects the steering force applied to the steering wheel 8. The torque sensor is accommodated in a sensor case 31.

The steering shaft 1 includes an upper shaft 11 having a substantially cylindrical shape, in which the steering wheel 8 is coupled to an upper end portion thereof, and a lower shaft 12 having a substantially cylindrical shape, in which the upper shaft 11 is linked coaxially and the output shaft 4 is coupled to the lower portion thereof via a torsion bar. The upper portion of the lower shaft 12 is inserted into a hollow part of the upper shaft 11 such that both shafts are connected via serrated portions. With such a connection via the serrated portions, the upper shaft 11 and the lower shaft 12 are linked such that they can be rotated integrally and, at the same time, they can be moved relatively in the axial direction.

The steering column 2 has an upper column tube 21 serving as a first column tube having a substantially cylindrical shape that rotatably supports the upper shaft 11 via a bearing 23; and a lower column tube 22 serving as a second column tube having a substantially cylindrical shape that is arranged coaxially with the upper column tube 21 and fixed to the sensor case 31 at a lower end portion thereof. The upper portion of the lower column tube 22 is inserted into the lower portion of the upper column tube 21 such that both tubes can be moved relatively in the axial direction. Relative movement in the axial direction between the upper shaft 11 and the upper column tube 21 is restricted by the bearing 23. A tubular small-diameter portion 31a having a diameter smaller than that of other parts is formed on an upper end portion of the sensor case 31, and an inner circumferential surface of a lower end portion of the lower column tube 22 is press-fitted to an outer circumferential surface of the small-diameter portion 31a.

The output shaft 4 is rotatably supported by the gear case 32 via a bearing 16.

The electric power steering device 100 is installed to a vehicle body via an upper fixing bracket 33 that is fixed to the vehicle body and supports the steering column 2, and a lower fixing bracket (not shown) that is fixed to the vehicle body and supports the gear case 32 via a pair of arms 38a and 38b so as to allow rocking movement.

The electric power steering device 100 includes a tilt mechanism that allows the rocking movement of the steering column 2 centered at the pair of arms 38a and 38b such that the steering wheel 8 is moved in the up-down direction (the direction shown by a solid-line arrow in FIG. 2) when viewed from a driver, a telescopic mechanism that allows extension/contraction of the steering column 2 such that the steering wheel 8 is moved in the back-forward direction (the direction shown by a broken-line arrow in FIG. 2) when viewed from a driver, and a release mechanism that is capable of switching a state in which the rocking movement and the extension/contraction of the steering column 2 are restricted and a state in which such a restriction is released.

The tilt mechanism, the telescopic mechanism, and the release mechanism will be described below.

A column bracket 51 is fixed to the upper column tube 21 so as to surround its outer circumference. The column bracket 51 is supported by a support bracket 52 that is fixed to the upper fixing bracket 33. The column bracket 51 is supported by the support bracket 52 via a guide pin 53 so as to be movable relative to the support bracket 52.

The support bracket 52 has a pair of side walls 52a that extend so as to sandwich both side walls 51a of the column bracket 51. The guide pin 53 is provided so as to pass through both side walls 52a of the support bracket 52 and both side walls 51a of the column bracket 51. Guide holes 52b that guide the movement of the guide pin 53 are respectively formed on both side walls 52a of the support bracket 52. The guide holes 52b are formed in the direction substantially orthogonal to the axial direction of the steering column 2. As the guide pin 53 moves along the guide holes 52b, the column bracket 51 moves along inner circumferential surfaces of both side walls 52a of the support bracket 52. Thus, the steering column 2 undergoes the rocking movement centered at the pair of arms 38a and 38b, and the steering wheel 8 moves in the up-down direction when viewed from a driver.

In addition, on both side walls 51a of the column bracket 51, guide holes 51b (see FIG. 3) that guide the movement of the guide pin 53 are respectively formed along the axial direction of the steering column 2. As the guide pin 53 moves along the guide holes 51b, the column bracket 51 moves along inner circumferential surfaces of both side walls 52a of the support bracket 52. Thus, the upper column tube 21 moves in the axial direction together with the upper shaft 11, and the steering wheel 8 moves in the back-forward direction when viewed from a driver.

An operating lever 37 that can be operated by a driver at a driver's seat is attached to the guide pin 53 in a rotatable manner. By operating the operating lever 37, both side walls 51a of the column bracket 51 are clamped/released by both side walls 52a of the support bracket 52. Specifically, both side walls 51a are clamped/released by the action of a cam that is rotated in accordance with the operation of the operating lever 37.

When the operating lever 37 is positioned at the clamping position, a state in which both side walls 51a of the column bracket 51 are clamped by both side walls 52a of the support bracket 52 is achieved, and the movement of the column bracket 51 relative to the support bracket 52 is restricted, and therefore, the rocking movement and the extension/contraction of the steering column 2 are restricted. On the other hand, when the operating lever 37 is positioned at the releasing position, a state in which clamping of both side walls 51a of the column bracket 51 by both side walls 52a of the support bracket 52 is released is achieved, and the movement of the column bracket 51 relative to the support bracket 52 is allowed, and therefore, the restrictions on the rocking movement and the extension/contraction of the steering column 2 are released.

Figure 2:
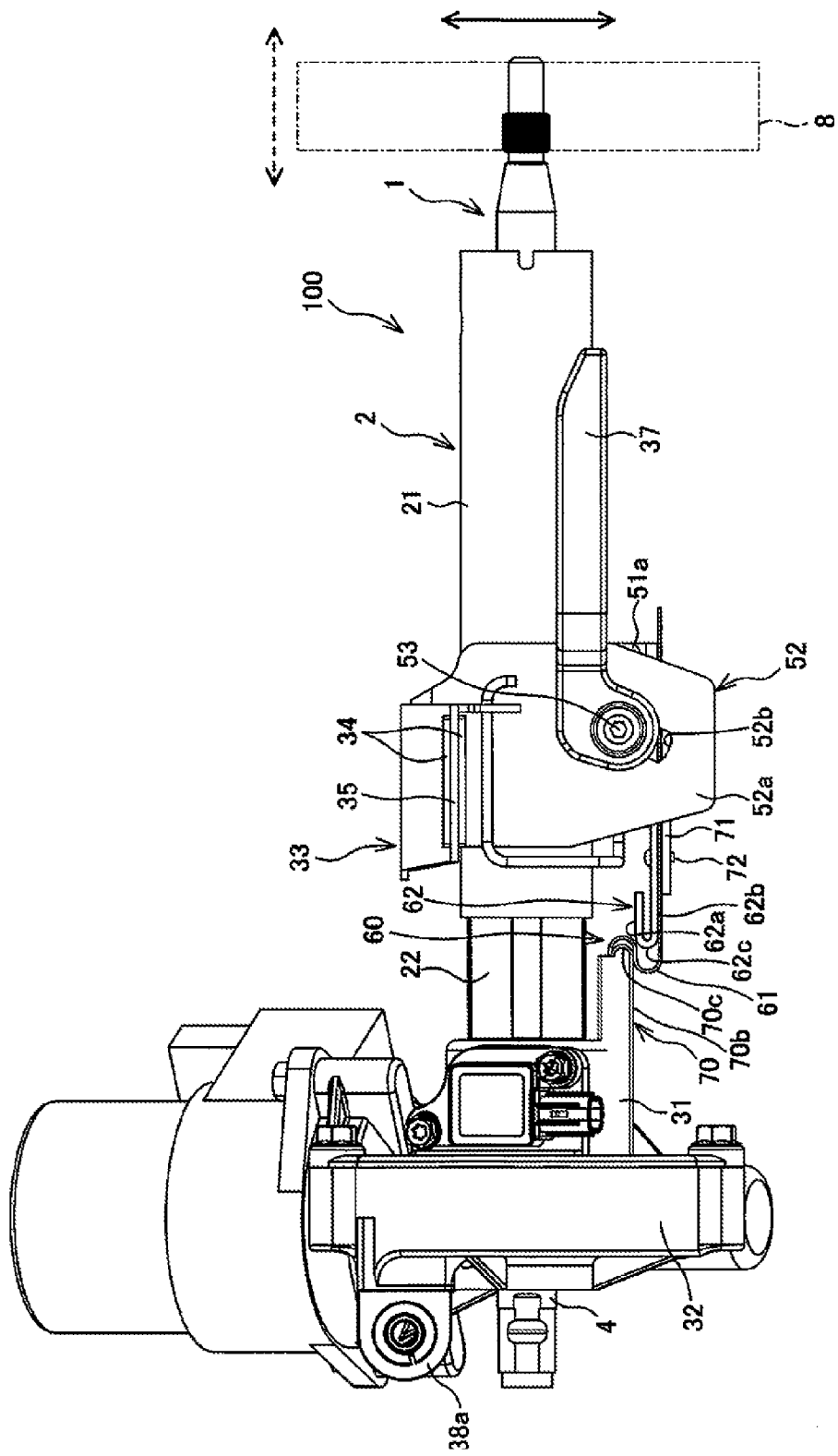
FIG. 2 is a side view of the electric power steering device according to the embodiment of the present invention.

As shown in FIGS. 1 and 2, the upper fixing bracket 33 includes a pair of capsules 34 that are fixed to the vehicle body, and a bracket 35 that is supported by the pair of capsules 34 and to which the support bracket 52 is connected. Cutouts 35a that open to the steering wheel 8 side and engage with the capsules 34 are formed on the bracket 35. Engaging grooves that engage with the cutout 35a are formed on both side-surfaces of the capsule 34. By sliding and mating the capsule 34 into and with the cutout 35a, the bracket 35 is held by the capsule 34, and the relative movement of the bracket 35 and the capsule 34 in the direction orthogonal to the axis of the upper column tube 21 is restricted. An insertion hole 34a for inserting a bolt for fixing the capsule 34 to the vehicle body is formed on the capsule 34. In addition, the pair of capsules 34 and the bracket 35 are connected by pins 36 made of resin that penetrate through both of the capsules 34 and the bracket 35.

When the steering shaft 1 is subjected to an excessive load via the steering wheel 8 in the event of a vehicle collision, the pins 36 are broken, and the bracket 35 is separated from the pair of capsules 34. As a result, the support bracket 52 moves together with the upper column tube 21 relative to the vehicle body. As described above, the electric power steering device 100 is configured such that, when the steering shaft 1 is subjected to an excessive load in the event of a vehicle collision, the upper column tube 21 and the upper shaft 11 move relative to the vehicle body, and the electric power steering device 100 includes an impact absorbing device 60 that absorbs the impact energy applied to the upper shaft 11 in the event of the collision.

The impact absorbing device 60 will be described below in detail.

Figure 3:
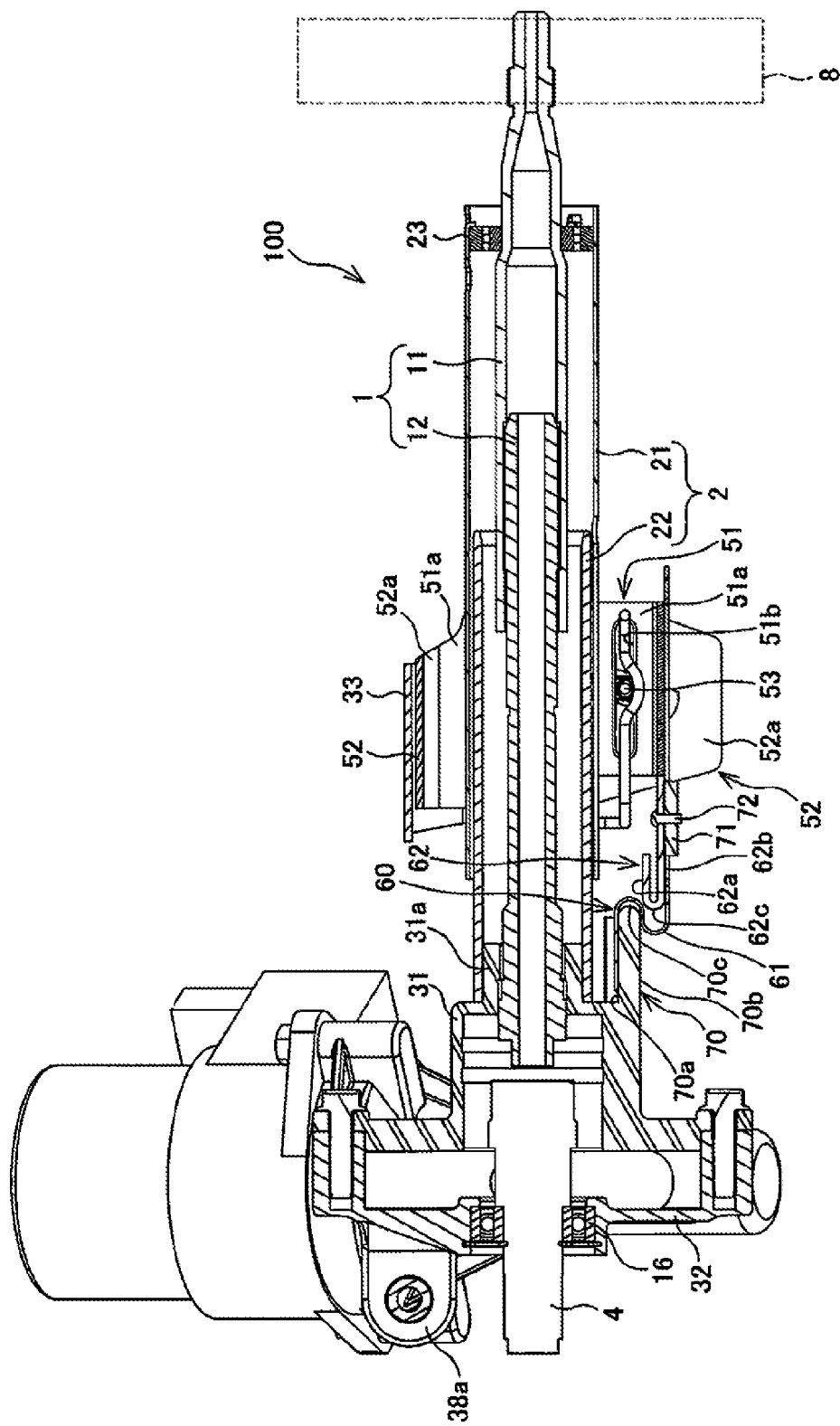
FIG. 3 is a sectional view taken along the line A-A in FIG. 1.

As shown in FIGS. 2 and 3, the impact absorbing device 60 includes an impact absorbing plate 61 that is provided integrally with the lower column tube 22 and absorbs impact energy and a pressing member 62 that is provided integrally with the upper column tube 21 and generates a deformation resistance by pressing and deforming the impact absorbing plate 61.

Figure 4:
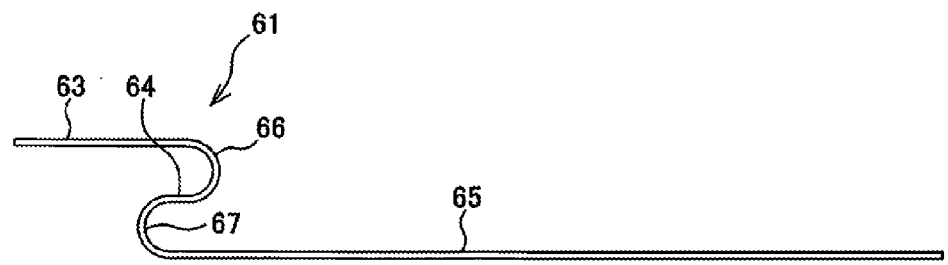
FIG. 4 is a side view of an impact absorbing plate.
Figure 5:
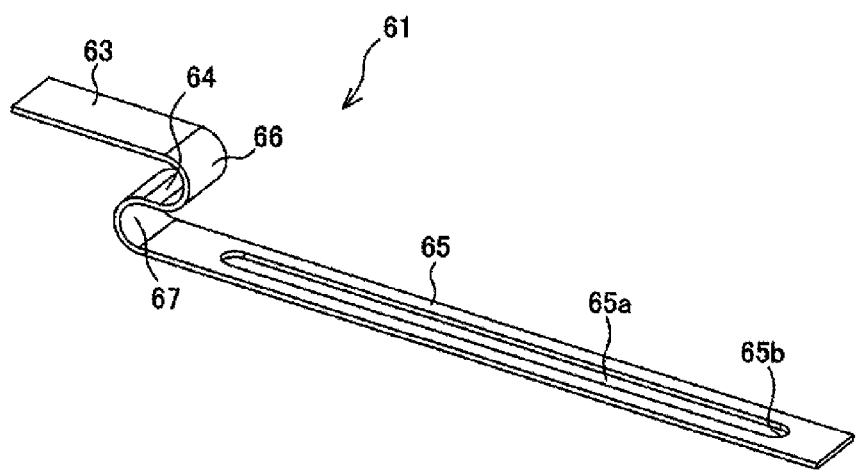
FIG. 5 is a perspective view of the impact absorbing plate.

As shown in FIGS. 4 and 5, the impact absorbing plate 61 is a substantially S-shaped member that has linear first, second, and third straight portions 63, 64, and 65, a first circular-arc portion 66 having a semi-circular shape that connects the first straight portion 63 and the second straight portion 64, and a second circular-arc portion 67 having a semi-circular shape that connects the second straight portion 64 and the third straight portion 65.

As shown in FIGS. 2 and 3, a supporting portion 70 that supports the impact absorbing plate 61 is formed on the sensor case 31. The supporting portion 70 has a pair of flat-surface portions 70a and 70b that extend in the axial direction of the steering shaft 1 and a curved-surface portion 70c that is formed on the tip ends of the pair of flat-surface portions 70a and 70b and that has the outer-circumference shape corresponding to the inner-circumference shape of the first circular-arc portion 66 of the impact absorbing plate 61.

The impact absorbing plate 61 is supported by the supporting portion 70 such that the pair of flat-surface portions 70a and 70b are sandwiched by the first straight portion 63 and the second straight portion 64, and that the first circular-arc portion 66 faces against the curved-surface portion 70c of the supporting portion 70. As described above, the impact absorbing plate 61 is provided integrally with the lower column tube 22 via the supporting portion 70 formed on the sensor case 31 and moves together with the lower column tube 22. The impact absorbing plate 61 may also be fixed to the supporting portion 70 by a fastening member, such as a bolt etc.

The pressing member 62 is connected to the column bracket 51. The pressing member 62 is a substantially U-shaped member having a pair of flat-surface portions 62a and 62b that extend in the axial direction of the steering shaft 1 and a curved-surface portion 62c that is formed on the tip ends of the pair of flat-surface portions 62a and 62b and that has the outer-circumference shape corresponding to the inner-circumference shape of the second circular-arc portion 67 of the impact absorbing plate 61. The pressing member 62 is connected to the column bracket 51 such that the curved-surface portion 62c faces against the second circular-arc portion 67. As described above, the pressing member 62 is provided integrally with the upper column tube 21 via the column bracket 51 and moves together with the upper column tube 21.

As shown in FIG. 5, a guide hole 65a extending in the axial direction of the steering shaft is formed on the third straight portion 65 of the impact absorbing plate 61. In addition, as shown in FIGS. 2 and 3 the guide 71 is connected to the flat-surface portion 62b on one side of the pressing member 62. The guide 71 relatively moves along the guide hole 65a upon the relative movement of the upper column tube 21 and the lower column tube 22 in the axial direction.

Figure 6:
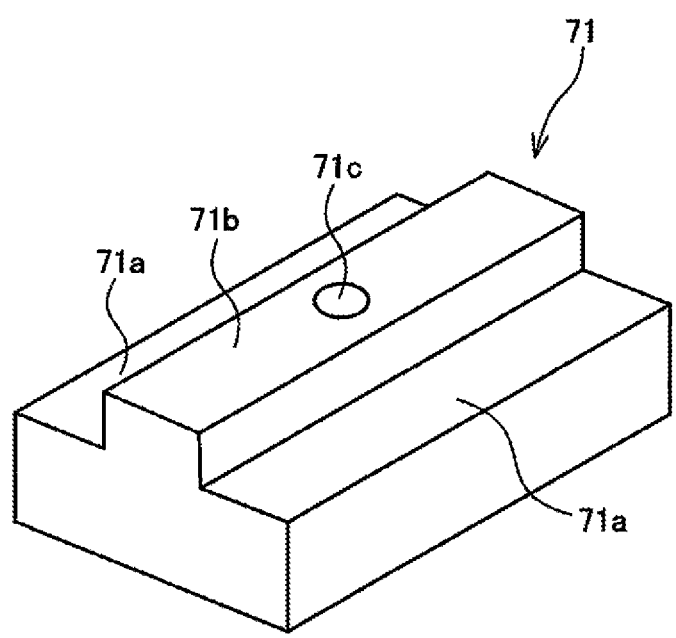
FIG. 6 is a perspective view of a guide.

As shown in FIG. 6, the guide 71 has a flat-surface portion 71a that sandwiches the third straight portion 65 of the impact absorbing plate 61 with the flat-surface portion 62b of the pressing member 62 and a guide portion 71b that is formed so as to project from the flat-surface portion 71a and inserted into the guide hole 65a.

A fastening hole 71c for fastening a bolt 72 is formed on the guide portion 71b, and the guide portion 71b is fastened to the flat-surface portion 62b of the pressing member 62 with the bolt 72. As described above, the guide 71 is provided integrally with the upper column tube 21 via the pressing member 62 and moves together with the upper column tube 21.

The guide portion 71b has a height greater than thickness of the third straight portion 65 of the impact absorbing plate 61. Therefore, upon the relative movement of the upper column tube 21 and the lower column tube 22 in the axial direction, the impact absorbing plate 61 moves relatively along the flat-surface portion 62b of the pressing member 62 and the flat-surface portion 71a of the guide 71 between the flat-surface portion 62b and the flat-surface portion 71a.

The guide 71 may be connected to the bottom surface of the column bracket 51. In this case, upon the relative movement of the upper column tube 21 and the lower column tube 22 in the axial direction, the impact absorbing plate 61 moves relatively along the bottom surface of the column bracket 51 and the flat-surface portion 71a of the guide 71 between the bottom surface and the flat-surface portion 71a. The guide 71 suffices to be configured so as to move together with the upper column tube 21, and connecting positions are not limited.

As described above, the impact absorbing plate 61 is supported by the supporting portion 70 that moves together with the lower column tube 22 at the one-end side, and is also supported by the guide 71 that moves together with the upper column tube 21 in a manner that allows the relative movement at the other-end side. In other words, the impact absorbing plate 61 is arranged such that the upper column tube 21 and the lower column tube 22 are coupled via the impact absorbing plate 61.

According to the embodiment mentioned above, the following advantages and effects can be afforded.

In the case where an excessive load is applied to the steering shaft 1 via the steering wheel 8 in the event of a vehicle collision, and the pins 36 are broken to cause separation of the bracket 35 from the pair of capsules 34, the upper column tube 21 moves in the direction that causes contraction of the steering column 2. Thus, the impact absorbing plate 61 that is supported by the supporting portion 70 is pressed by the pressing member 62 and undergoes deformation, thereby generating a deformation resistance. Specifically, the curved-surface portion 62c of the pressing member 62 fits to the inner circumference of the second circular-arc portion 67 of the impact absorbing plate 61, and the curved-surface portion 70c of the supporting portion 70 fits to the inner circumference of the first circular-arc portion 66 of the impact absorbing plate 61, and thereby, the impact absorbing plate 61 undergoes the deformation such that the second straight portion 64 is stretched and the third straight portion 65 is contracted as a result of the movement of the pressing member 62. Because the upper column tube 21 moves against the deformation resistance of the impact absorbing plate 61, the impact energy applied to the upper shaft 11 is absorbed.

As shown in FIGS. 2 and 3, it is desirable to provide a gap between the first circular-arc portion 66 of the impact absorbing plate 61 and the curved-surface portion 70c of the supporting portion 70. With such a configuration, even when the moving direction of the pressing member 62 is deviated relative to the axial direction of the impact absorbing plate 61, the pressing member 62 is guided into the second circular-arc portion 67 by being brought into contact with the first circular-arc portion 66 of the impact absorbing plate 61.

When the impact absorbing plate 61 is undergoing the deformation, although the third straight portion 65 moves in the direction that causes its contraction, because the third straight portion 65 is supported by the guide 71, a stable deformation of the impact absorbing plate 61 is achieved.

In addition, the guide hole 65a is formed on the impact absorbing plate 61 that is provided integrally with the lower column tube 22, and the guide 71 that relatively moves along the guide hole 65a is integrally provided on the upper column tube 21, and therefore, a relative rotation of the upper column tube 21 and the lower column tube 22 during installation of the electric power steering device 100 to a vehicle can be prevented by the impact absorbing plate 61. Thus, the electric power steering device 100 is superior in installability to a vehicle.

As described above, because the impact absorbing plate 61 has a function of absorbing the impact energy and a mechanism that prevents the relative rotation of the upper column tube 21 and the lower column tube 22 during installation to a vehicle, it is possible to effectively utilize the impact absorbing plate 61.

Furthermore, in a case where the electric power steering device 100 that is not installed on the vehicle body is transported, if the operating lever 37 is positioned at the releasing position, there is a risk that the lower column tube 22 will be detached from the upper column tube 21 due to the weight of the electric motor 13, because the upper column tube 21 and the lower column tube 22 are in a state that they can be moved relatively. However, in such a situation, the guide portion 71b of the guide 71 is brought into contact with an end portion 65b of the guide hole 65a of the impact absorbing plate 61 (see FIG. 5), thereby restricting the movement of the lower column tube 22 and preventing detachment thereof. As described above, because the relative movement of the upper column tube 21 and the lower column tube 22 in the detaching direction at or greater than a predetermined level is restricted by the guide 71, the electric power steering device 100 is superior in transportability.

Embodiments of this invention were described above, but the above embodiments are merely examples of applications of this invention, and the technical scope of this invention is not limited to the specific constitutions of the above embodiments.

For example, in the above-mentioned embodiment, the impact absorbing plate 61 is described to be provided integrally with the lower column tube 22, and the guide 71 is described to be provided integrally with the upper column tube 21. Instead of this configuration, the impact absorbing plate 61 may be provided integrally with the upper column tube 21, and the guide 71 may be provided integrally with the lower column tube 22. In such a case, the pressing member 62 is, for example, fixed to the sensor case 31 and provided integrally with the lower column tube 22. In addition, the supporting portion 70 supporting the impact absorbing plate 61 is provided on the column bracket 51, for example, so as to move together with the upper column tube 21. With such a configuration, the upper column tube 21 serves as a second column tube, and the lower column tube 22 serves as a first column tube.

In addition, in the above-mentioned embodiment, although a case in which the guide hole 65a is formed on the third straight portion 65 of the impact absorbing plate 61 is illustrated, the guide hole 65a may be formed so as to extend from the third straight portion 65 to any of the second circular-arc portion 67, the second straight portion 64, the first circular-arc portion 66, and the first straight portion 63. By adjusting the length of the guide hole 65a, it is possible to adjust the deformation resistance of the impact absorbing plate 61.

In addition, although the electric power steering device has been described in the above-mentioned embodiment, the present invention may be applied to a hydraulic power steering device, and in addition, the present invention may also be applied to a steering device in which a steering force applied to a steering wheel by a driver is not assisted.

This application claims priority based on Japanese Patent Application No. 2012-195174 filed with the Japan Patent Office on Sep. 5, 2012, the entire contents of which are incorporated into this specification.

The invention claimed is:

1. A steering device, comprising:
    an impact absorbing device for absorbing impact energy applied to a steering shaft via a steering wheel;
    a steering column configured to rotatably support the steering shaft inserted into an interior of the steering column, wherein
        the steering column has a first column tube and a second column tube that are relatively movable in an axial direction of the steering column, and
        the impact absorbing device comprises:
            an impact absorbing plate provided integrally with the second column tube, the impact absorbing plate being configured to absorb the impact energy; and
            a pressing member provided integrally with the first column tube, the pressing member being configured to generate deformation resistance by pressing and deforming the impact absorbing plate;
    a guide hole extending in the axial direction of the steering column and provided on the impact absorbing plate; and
    a guide relatively movable in the guide hole upon relative movement of the first column tube and the second column tube in the axial direction, the guide provided integrally with the first column tube,
    wherein the guide is a separate member from the pressing member.

2. A steering device according to claim 1, wherein the relative movement of the first column tube and the second column tube in a detaching direction at or greater than a predetermined level is restricted by a contact of the guide with an end portion of the guide hole.

3. A steering device according to claim 1, wherein the guide has a guide portion inserted into the guide hole, and the guide portion is fastened to the pressing member.

4. A steering device according to claim 1, wherein the impact absorbing plate is supported
    at a first side, by a supporting portion movable together with the second column tube, and
    at a second side, by the guide movable together with the first column tube in a manner that allows the relative movement, the second side opposite the first side in the axial direction.

5. A steering device according to claim 4, wherein the impact absorbing plate is a substantially S-shaped member that has
    first, second, and third straight portions,
    a first circular-arc portion having a semi-circular shape and connecting the first straight portion and the second straight portion, and
    a second circular-arc portion having a semi-circular shape and connecting the second straight portion and the third straight portion,
the supporting portion has
    a pair of flat-surface portions that extend in the axial direction of the steering column, and
    a curved-surface portion that connects tip ends of the pair of flat-surface portions and has an outer-circumference shape corresponding to an inner-circumference shape of the first circular-arc portion of the impact absorbing plate, and
the impact absorbing plate is supported by the supporting portion such that
    the pair of flat-surface portions are sandwiched by the first straight portion and the second straight portion, and
    the first circular-arc portion faces against the curved-surface portion.

6. A steering device according to claim 5, wherein the pressing member has
    a pair of flat-surface portions that extend in the axial direction of the steering column, and
    a curved-surface portion that connects tip ends of the pair of flat-surface portions and has an outer-circumference shape corresponding to an inner-circumference shape of the second circular-arc portion of the impact absorbing plate, and
the pressing member is arranged such that the curved-surface portion of the pressing member faces against the second circular-arc portion of the impact absorbing plate.

7. A steering device, comprising:
    an impact absorbing device for absorbing impact energy applied to a steering shaft via a steering wheel;
    a steering column configured to rotatably support the steering shaft inserted into an interior of the steering column, wherein
        the steering column has a first column tube and a second column tube that are relatively movable in an axial direction of the steering column, and the impact absorbing device comprises:
an impact absorbing plate provided integrally with the second column tube, the impact absorbing plate being configured to absorb the impact energy; and
a pressing member provided integrally with the first column tube, the pressing member being configured to generate deformation resistance by pressing and deforming the impact absorbing plate;
a guide hole extending in the axial direction of the steering column and provided on the impact absorbing plate; and
a guide relatively movable in the guide hole upon relative movement of the first column tube and the second column tube in the axial direction, the guide provided integrally with the first column tube,
wherein the guide is spaced apart from a position at which the pressing member presses the impact absorbing plate when the pressing member presses and deforms the impact absorbing plate.

8. A steering device according to claim 7, wherein the relative movement of the first column tube and the second column tube in a detaching direction at or greater than a predetermined level is restricted by a contact of the guide with an end portion of the guide hole.

9. A steering device according to claim 7, wherein the guide has a guide portion inserted into the guide hole, and
the guide portion is fastened to the pressing member.

10. A steering device according to claim 7, wherein the impact absorbing plate is supported
at a first side, by a supporting portion movable together with the second column tube, and
at a second side, by the guide movable together with the first column tube in a manner that allows the relative movement, the second side opposite the first side in the axial direction.

11. A steering device according to claim 10, wherein the impact absorbing plate is a substantially S-shaped member that has
first, second, and third straight portions,
a first circular-arc portion having a semi-circular shape and connecting the first straight portion and the second straight portion, and
a second circular-arc portion having a semi-circular shape and connecting the second straight portion and the third straight portion,
the supporting portion has
a pair of flat-surface portions that extend in the axial direction of the steering column, and
a curved-surface portion that connects tip ends of the pair of flat-surface portions and has an outer-circumference shape corresponding to an inner-circumference shape of the first circular-arc portion of the impact absorbing plate, and
the impact absorbing plate is supported by the supporting portion such that
the pair of flat-surface portions are sandwiched by the first straight portion and the second straight portion, and
the first circular-arc portion faces against the curved-surface portion.

12. A steering device according to claim 11, wherein the pressing member has
a pair of flat-surface portions that extend in the axial direction of the steering column, and
a curved-surface portion that connects tip ends of the pair of flat-surface portions and has an outer-circumference shape corresponding to an inner-circumference shape of the second circular-arc portion of the impact absorbing plate, and
the pressing member is arranged such that the curved-surface portion of the pressing member faces against the second circular-arc portion of the impact absorbing plate.

* * * * *